Jan. 17, 1939. M. A. GIBBONS 2,144,288

VALVE UNIT

Filed May 13, 1936

Inventor:—
Michael A. Gibbons
by his Attorneys
Howson & Howson

Patented Jan. 17, 1939

2,144,288

UNITED STATES PATENT OFFICE 2,144,288

VALVE UNIT

Michael A. Gibbons, Philadelphia, Pa.

Application May 13, 1936, Serial No. 79,584

4 Claims. (Cl. 251—146)

This invention relates to a valve unit for use in hydraulic or pneumatic pumps, tanks, or pipe lines, etc., wherein a flow of liquid or gaseous fluid is to be permitted in one direction and checked against movement in the opposite direction.

One object of the invention is to provide a rugged and simple construction for a valve of the type noted above and which will provide a superior balance to the moving element of the valve and whereby, if desired, the valve may be used without the customary reseating spring.

Another object of the invention is to construct the valve unit with the valve spindle, the reseating spring when used, and the valve stem support all below the valve seat, whereby greater head room above the valve disc is provided when the valve unit is used in a pump of the type wherein the valve unit, including the valve seat ring or cage and the operating parts of the valve must be installed through a side opening in the valve chest of the pump, thereby providing for a greater valve lift than has been possible heretofore with a resulting increase in efficiency and saving of power; and whereby installation and assembly of the valve unit in the pump is simplified and expedited.

Another object of the invention is to construct the valve unit in such a manner that the valve seat will not be marred by the tool commonly used in tightening the valve cage in the pump head which heretofore has resulted in inefficient operation of the valve requiring considerable time and labor to redress the valve seat in order to provide a proper seal between the valve seat and the valve disc.

Another object of the invention residing in the underslinging of the valve spindle, the spring, the support, etc., in the manner peculiar to the present case, is to eliminate wear on the valve disc around the valve stud or spindle which in valves of the prior art contribute to the unbalancing of the valve and is responsible for a considerable portion of the noise of the valve which is caused by a fluttering of the valve disc when unseated.

Another object of the invention is to construct the valve in a manner to prevent leakage past the valve disc as results from wearing away of the valve disc around the valve spindle.

Another object is to construct the valve in such a manner that all valves in any given set found in a pump, etc., will have the same uniform fixed spring pressure without it being necessary to resort to delicate adjustment of the independent valves after installation.

The construction and operation of the valve will be fully disclosed hereinafter, reference being had to the accompanying drawing, of which Fig. 1 is a longitudinal or vertical sectional elevation of the valve assembly;

Figure 1:
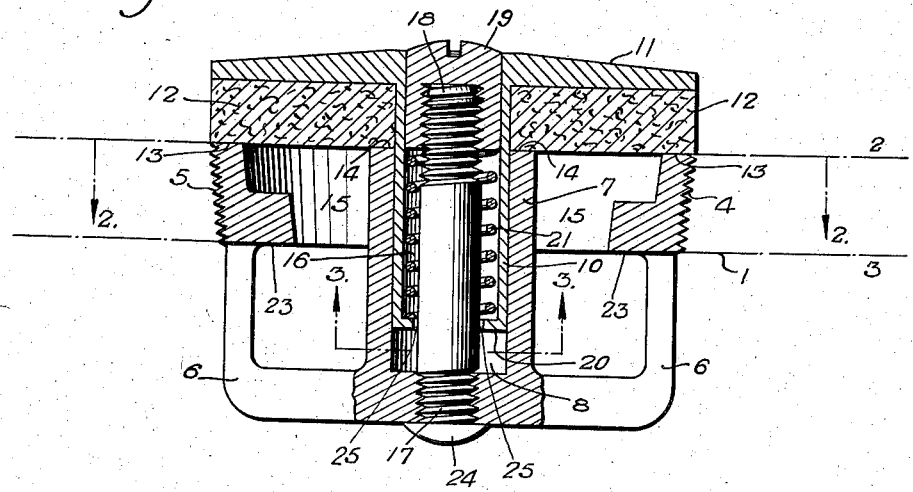
Figure 2:
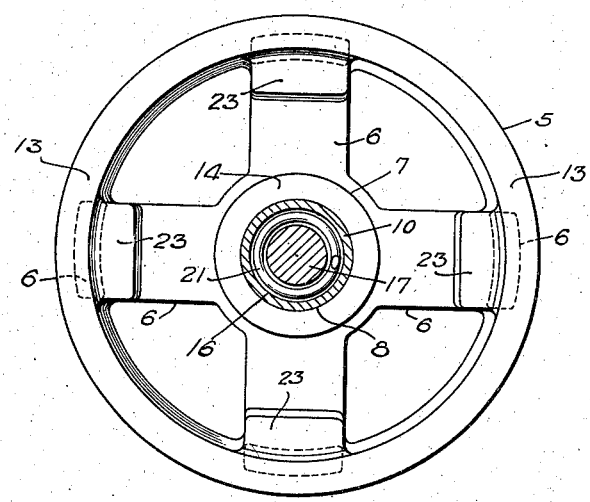
Fig. 2 is a sectional plan view taken on the line 2—2, Fig. 1.
Figure 3:
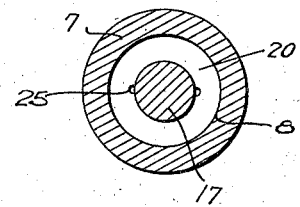
Fig. 3 is an inverted sectional plan view taken on the line 3—3, Fig. 1.

In the drawing, 1 represents a rigid division wall between two chambers 2 and 3 of either a pump or a valve housing of a pipe line, or an exterior wall of a tank, etc., in which the valve unit may function as a safety valve to relieve excess pressure to the atmosphere. The partition wall 1 is provided with an opening 4 in which the valve unit forming the subject of the present invention is adapted to be installed.

In the present instance the opening 4 is threaded and the unit comprises an externally threaded ring 5 which is adapted to be threaded into the tapped opening 4 in the partition 1 and to be drawn down sufficiently tight to form a fluid seal therebetween.

Projecting downwardly and radially inward from one end of the ring 5 is a series of arms 6, 6. The arms 6 intersect at the axis of the ring 5 and support a central cylindrical hub-like element 7 which is formed integral with the arms 6 and projects inwardly therefrom through the ring 5 to the opposite end thereof, leaving a clear unobstructed annular fluid passage 15 between the outer surface of the cylinder 7 and the inner surface of the ring 5.

The cylindrical element 7 is axially bored, at 8, inwardly from the end thereof which is remote to the arms 6 for slidably supporting a hollow valve stem 10.

The upper end of the hollow valve stem 10 is provided with a substantially flat circular main or body disc 11 to the under side of which is suitably secured a fiber or other suitable facing or sealing disc 12.

The under side of the sealing disc 12, adjacent the outer peripheral edge thereof, is adapted to seat on a valve seat 13 formed on that edge or end of the valve ring 5 which is opposite to the end or edge from which the arms project.

The inner portion of the disc 12, immediately surrounding the valve stem 10, is adapted to seat on a valve seat 14 formed on the upper end of the cylindrical hub or bearing 7.

Threaded into the bottom or base of the cylinder 7 and extending axially through the bore 8 thereof and through the bore 16 of the hollow valve stem 10 is a stud or spindle 17, the upper portion 18 of which is threaded and slightly beveled at its extreme upper end to receive an internally bored and threaded nut 19 which has a smooth cylindrical outer surface snugly fitting within the bore 16 of the valve stem 10.

The lower end of the stud 17 may, if desired, be peaned over the bottom of the cylinder 7 as indicated at 24 to prevent loosening of the stud in the spider formed by the intersecting arms 6, 6.

The lower end of the hollow valve stem 10 is provided with an inturned flange 20. The under side of the nut 19 and the upper side of the inturned flange 20 form annular abutments around the stud 17 and confined between the abutment formed by the upper side of the flange 20 and the abutment formed by the lower face of the nut 19 and encircling the stud 17 is a compression spring 21 which tends to move the valve element, including the hollow stem 10, the main disc 11 and the facing disc 12 downwardly to seat the disc 12 firmly on the valve seats 13 and 14.

The spring 21 may, in come instances at least, be eliminated as the valve, due to the long bearing of the outer surface of the stem 10 in the bore 8 of the spider hub 7, and the bearing of the inner surfaces of said stem and its flange 20 on the outer surfaces of the nut 19 and stud 17 respectively will guide the valve onto its seat accurately and without fluttering, due to the balance of the valve discs 11 and 12.

In cases where the reseating spring 21 is eliminated, the inner end surface of the retaining nut 19 will function as a stop for the movable element of the valve, including the main disc 11, the facing disc 12, and the depending hollow stem 10, by engaging the inner surface of the flange 20 of the stem 10 when the valve is fully opened.

The flange 20 is provided with breather openings 25, 25 at opposite sides of the stud 17 which provide for the by-passing of fluid, liquid or gaseous, from one side of said flange to the other side thereof and which would otherwise become trapped in the bores 8 and 16 between the flange and the ends of the cavities 8 and 16 and prevent free action or proper seating of the valve.

The flange 20 working between the base of the counter-bore 8 of the central hub 7 and the inner end of the nut 19 functions as a piston operating in a cylinder and the breather openings 25 in said flange 20 functioning as a by-pass for fluid otherwise trapped in such cylinder produces a cushioning effect without unduly retarding or making the action of the valve sluggish. This cushioning effect eliminates hammering of the valve and the noises and wear attending such hammering.

Projecting inwardly from the ring 5, in the present instance in radial line with each of the arms 6 is a ring tightening or loosening lug 23. It will be noted that the upper surfaces of the lugs 23 are disposed well below the plane of the valve seats 13 and 14 so that these lugs at no time could engage the disc 12.

It will be noted that the nut 19 is screwed down on the upper end of the stud 17 until the base of the threaded bore of the nut bears tightly against the upper end of the stud 17 which locks the nut 19 in place on the stud with the inner end of the nut in definite relation to the upper face of the flange 20 of the hollow valve stem 10 and with springs of predetermined strength, each spring is compressed to a definite extent. Thus in apparatus employing a plurality of such valve units, all of said valves would operate under exactly the same spring pressure.

Heretofore in commercially obtainable valves of the general type noted above and of which the valve shown in U. S. Patent No. 1,385,932 is typical, radial arms somewhat similar to the arms 6 of the present valve are disposed with the upper edges thereof in the same plane as that of the valve seat, i. e. flush with the valve seat. At the intersection of the radial arms a stud somewhat similar to the stud 17 of the present valve is supported and projects vertically above the valve seat. The valve discs are slidably mounted on the central stud above the valve seat and the valve disc has a hub slidably mounted on the stud above the top disc of the valve. The reseating spring is mounted between the upper surface of the top disc and the lower surface of a nut which is threaded on to the upper end of the stud.

With such prior art construction, the valve disc has bearing on the upper edges of the radial arms which support the central stud and under conditions of use, the under side of the valve disc by reason of its intermittent engagements with the valve seat and the upper edges of the radial arms causes the valve seat and the radial arms to form an annular groove and radial grooves respectively in the under side of said disc. Consequently, if for any reason the movable element of the valve should be caused to rotate to a slight degree around the axis of the stud, from the position in which it has been constantly working, the part of the disc which had previously been lying between the stud-supporting arms engages the top edges of said arms and prevents the valve from seating properly. Furthermore, valves of this kind wear rapidly around the central stud with a consequent leakage past the valve discs and a resulting unbalancing of the moving parts of the valve which causes the valve elements to flutter in the flow of fluid through the valve.

In screwing valves of this prior art type into the threaded openings adapted to receive the valve a tool is usually inserted between the radiating arms, to engage the sides of said arms, and in the old type valves the contact of the tool with the upper edges of the arms frequently produced burrs on the upper surface edges of the arms which extended above the plane of the valve seat and prevented the valve from seating properly.

Advantages of the valve unit forming the subject of this invention over valves of the prior art reside primarily in the fact that all of the operating parts of the valve and the cylinder 7 which forms the sliding bearing for the valve stem 10, are disposed below the valve seats 5 and 14; and that the disc 12 engages the seat 14 at the same time as it engages the main seat 5 which prevents leakage around the valve stem.

One advantage resulting from the above noted construction is that the valve stem has a greater surface bearing than in the valves heretofore, and wear is accordingly reduced and even when wear occurs the valve seat 14 prevents leakage around the valve stem.

Another advantage is the lack of ribs between the ring 5 and hub 7, which prevents the formation of depressions in the under side of the disc which would prevent the disc from seating properly if the valve should rotate for any reason.

Another advantage is that the top edges of the lugs 23 if engaged by the seating tool are well below the valve seat 13, thereby eliminating the possibilities of burrs being formed by the seating tool which would project above the plane of the valve seats 13 and 14 and keep the valve from seating properly.

Another advantage is that no radial arms or ribs being present between the ring 5 and hub 7 a greater flow through the valve is made possible than could be obtained heretofore.

Another advantage resides in the fact that the valve may be more easily assembled after the ring has been screwed in place in a pump, for example, because it is not necessary to hold several parts together, including the spring under compression during assemblage.

Other advantages will be apparent to those skilled in the art and in the practical use of valves of the type noted. Modifications of the structure disclosed herein for the purpose of illustrating the principles of the present invention will be apparent to those skilled in the art, but which will come within the scope of the present invention as mechanical equivalents, etc., without departing from the spirit of the invention.

I claim:

1. A valve unit comprising a ring, a substantially flat valve disc disposed outside and substantially parallel to one end of said ring and provided with a hollow stem extending axially through said ring beyond the opposite end thereof, a valve seat on said end of said ring, a sealing disc carried by said flat disc between said flat disc and said valve seat for sealing engagement therewith, an arm extending from said opposite end of said ring and laterally across the axis thereof in spaced relation to said ring, a stud extending axially through said hollow stem and secured at one of its ends to said arm, an annular abutment on the opposite end of said stud and snugly fitting within said hollow stem, an annular abutment on said hollow stem and encircling said stud intermediate the abutment on the stud and said arm, a cylindrical hub on said arm and extending through said ring to the valve seat end thereof and snugly encircling said hollow stem, and a valve seat on said hub end adapted to be engaged by said sealing disc.

2. A valve unit comprising a ring, a substantially flat valve disc disposed outside and substantially parallel to one end of said ring and provided with a hollow stem extending axially through said ring beyond the opposite end thereof, a valve seat on said end of said ring, a sealing disc carried by said flat disc between said flat disc and said valve seat for sealing engagement therewith, an arm extending from said opposite end of said ring and laterally across the axis thereof in spaced relation to said ring, a stud extending axially through said hollow stem and secured at one of its ends to said arm, an annular abutment on the opposite end of said stud and snugly fitting within said hollow stem, an annular abutment on said hollow stem and encircling said stud intermediate the abutment on the stud and said arm, a cylindrical hub on said arm and extending through said ring to the valve seat end thereof and snugly encircling said hollow stem, and a valve seat on said hub end adapted to be engaged by said sealing disc, said annular abutment on said hollow stem having a breather opening affording fluid by-pass communication between the interior of the hollow stem above the last said abutment and the interior of the cylindrical hub below said abutment.

3. A valve unit comprising a ring, a substantially flat valve disc disposed outside and substantially parallel to one end of said ring and provided with a hollow stem extending axially through said ring beyond the opposite end thereof, a valve seat on said end of said ring, a sealing disc carried by said flat disc between said flat disc and said valve seat for sealing engagement therewith, an arm extending from said opposite end of said ring and laterally across the axis thereof in spaced relation to said ring, a stud extending axially through said hollow stem and secured at one of its ends to said arm, an annular abutment on the opposite end of said stud and snugly fitting within said hollow stem, an annular abutment on said hollow stem and encircling said stud intermediate the abutment on the stud and said arm, a spring encircling said stud between said abutments, a cylindrical hub on said arm and extending through said ring to the valve seat end thereof and snugly encircling said hollow stem, and a valve seat on said hub end adapted to be engaged by said sealing disc.

4. A valve unit comprising a ring, a substantially flat valve disc disposed outside and substantially parallel to one end of said ring and provided with a hollow stem extending axially through said ring beyond the opposite end thereof, a valve seat on said end of said ring, a sealing disc carried by said flat disc between said flat disc and said valve seat for sealing engagement therewith, an arm extending from said opposite end of said ring and laterally across the axis there of in spaced relation to said ring, a stud extending axially through said hollow stem and secured at one of its ends to said arm, an annular abutment on the opposite end of said stud and snugly fitting within said hollow stem, an annular abutment on said hollow stem and encircling said stud intermediate the abutment on the stud and said arm, a spring encircling said stud between said abutments, a cylindrical hub on said arm and extending through said ring to the valve seat end thereof and snugly encircling said hollow stem, and a valve seat on said hub end adapted to be engaged by said sealing disc, said annular abutment on said hollow stem having a breather opening affording fluid by-pass communication between the interior of the hollow stem above the last said abutment and the interior of the cylindrical hub below said abutment.

MICHAEL A. GIBBONS.